(12) United States Patent
Kiga et al.

(10) Patent No.: US 7,618,604 B2
(45) Date of Patent: Nov. 17, 2009

(54) METHOD AND APPARATUS FOR REMOVING GASEOUS MERCURY IN FLUE GAS

(75) Inventors: Takashi Kiga, Yokohama (JP); Noriyuki Iiyama, Aioi (JP); Kenji Takano, Matsudo (JP); Akimasa Yamaguchi, Yokosuka (JP); Yoshihisa Tochihara, Yokosuka (JP); Shigeo Ito, Yokosuka (JP)

(73) Assignees: IHI Corporation (JP); Central Research Institute of Electric Power Industry (JP)

( * ) Notice: Subject to any disclaimer, the term of this patent is extended or adjusted under 35 U.S.C. 154(b) by 178 days.

(21) Appl. No.: 11/572,059

(22) PCT Filed: Jul. 14, 2005

(86) PCT No.: PCT/JP2005/013065

§ 371 (c)(1),
(2), (4) Date: Jan. 12, 2007

(87) PCT Pub. No.: WO2006/009079

PCT Pub. Date: Jan. 26, 2006

(65) Prior Publication Data

US 2008/0008638 A1  Jan. 10, 2008

(30) Foreign Application Priority Data

Jul. 15, 2004 (JP) .............................. 2004-208567

(51) Int. Cl.
*B01D 53/64* (2006.01)
*B01D 53/56* (2006.01)
*B01D 53/50* (2006.01)
*B01D 53/74* (2006.01)
*B01D 53/86* (2006.01)
*B01D 53/88* (2006.01)

(52) U.S. Cl. .................. 423/210; 423/235; 423/243.01; 422/168; 422/169; 422/170; 422/171; 422/177; 422/180; 422/181

(58) Field of Classification Search ................. 423/210, 423/235, 243.01; 422/168–171, 177, 180, 422/181
See application file for complete search history.

(56) References Cited

U.S. PATENT DOCUMENTS

2003/0047440 A1* 3/2003 Granite et al. ........... 204/157.4

(Continued)

FOREIGN PATENT DOCUMENTS

DE  4224676  2/1993

(Continued)

OTHER PUBLICATIONS

International Search Report PCT/JP2005/013065 dated Aug. 3, 2005 (Japanese Patent Office).

*Primary Examiner*—Timothy C Vanoy
(74) *Attorney, Agent, or Firm*—Ostrolenk Faber LLP

(57) ABSTRACT

An object of the present invention is to provide a method for removing gaseous mercury in flue gas that make it possible to remove mercury in flue gas extremely satisfactorily while handling is made easy and cost increases are kept under control. In order to accomplish the object, the present invention adopts the method of removing gaseous mercury in flue gas, in which, after water-insoluble mercury in the flue gas is converted into water-soluble mercury by placing the flue gas in contact with a solid catalyst formed by a metal oxide, wet-type absorption is performed on the water-soluble mercury.

65 Claims, 7 Drawing Sheets

U.S. PATENT DOCUMENTS

2003/0170159 A1  9/2003  Honjo et al. ................ 423/210

FOREIGN PATENT DOCUMENTS

| EP | 0 527 457 | 2/1993 |
| EP | 0527457 | 2/1993 |
| JP | 63-088024 | 9/1986 |
| JP | 3026521 | 3/1991 |
| JP | 08-192029 | 7/1996 |
| JP | 08-270930 | 10/1996 |
| JP | 10-230137 | 9/1998 |
| JP | 2000-197811 | 7/2000 |
| JP | 2000-262858 | 9/2000 |
| JP | 2001-25642 | 1/2001 |
| JP | 2003-53142 | 2/2003 |
| JP | 2003-053142 | 2/2003 |
| WO | WO 03/015900 | 2/2003 |

* cited by examiner

METHOD AND APPARATUS FOR REMOVING GASEOUS MERCURY IN FLUE GAS

CROSS REFERENCE TO RELATED APPLICATION

The present application is a 35 U.S.C. § 371 national phase conversion of PCT/JP2005/013065 filed Jul. 14, 2005, which claims priority of Japanese Application No. 2004-208567 filed Jul. 15, 2004, which are incorporated by reference. The PCT International Application was published in the Japanese language.

TECHNICAL FIELD

The present invention relates to a method and apparatus for removing gaseous mercury in flue gas such as flue gas of coal and heavy oil fired boiler.

BACKGROUND ART

Mercury is present in coal firing flue gas and heavy oil firing flue gas, or in the flue gas from refuse incineration power generation, and it is imperative that this mercury be removed prior to the flue gas being emitted into the atmosphere. Among the conventional technologies for removing mercury from flue gas is a method in which a solid absorbent such as activated carbon is installed in an initial stage of a stack and mercury is absorbed by the solid absorbent at a stage prior to the flue gas being emitted into the atmosphere, and a method in which a wet-type denitrification apparatus is provided on a flow path that extends from a boiler to a stack along which flue gas is made to flow, and a mercury oxidizing agent is placed on the upstream side of the wet-type denitrification apparatus, whereupon, after water-insoluble mercury contained in the flue gas has been converted into water-soluble mercury chloride and the like, it is absorbed by the wet-type denitrification apparatus. Moreover, another method exists in which an oxidizing agent is added to a wet-type denitrification absorption liquid, and mercury in the denitrification absorption liquid is oxidized and converted into water-soluble mercury.

Furthermore, in Patent Document 1 described below, technology is disclosed in which, in a flue gas processing apparatus that is provided with a denitrification apparatus and a wet-type denitrification apparatus, HCl or the like is fed to the upstream side of the denitrification apparatus so that mercury is oxidized by the denitrification apparatus. In Patent Document 2 described below, technology is disclosed in which flue gas is brought into contact with metal chloride or the like on the upstream side of a wet-type denitrification apparatus so that water-insoluble mercury is converted into water-soluble mercury chloride which is then absorbed by the wet-type denitrification apparatus. In Patent Document 3 described below, technology is disclosed in which flue gas is brought into contact with a carrier carrying a catalyst upstream from a wet-type denitrification apparatus so that water-insoluble mercury is converted into water-soluble mercury chloride which is then absorbed by the wet-type denitrification apparatus.

[Patent Document 1] Japanese Patent Application Laid-Open (JP-A) No. 10-230137
[Patent Document 2] Japanese Patent Application Laid-Open (JP-A) No. 2000-197811
[Patent Document 3] Japanese Patent Application Laid-Open (JP-A) No. 2003-053142

The following problems, however, exist in the above described conventional technology.

In the technology in which a solid absorbent is installed in an initial stage of a stack, for example, no efficient means has been established for processing the used solid absorbent so that there is a possibility that the environment will be affected. Moreover, because the structure in which a mercury oxidizing agent is provided on the upstream side of a wet-type denitrification apparatus and the structure in which an oxidizing agent is added to a wet-type denitrification absorption liquid are structures in which an oxidizing agent is injected directly into flue gas or waste water, there is a possibility that the environment will be affected. If a need arises to perform additional processing in order to reduce the effects on the environment, then the processing load increases. Moreover, in the structure in which an oxidizing agent is injected directly, equipment to inject the oxidizing agent is necessary so that there is an increase in equipment costs.

Furthermore, in the technology disclosed in Patent Document 1 as well, because a structure is employed in which a chemical substance such as HCl or the like is positively injected into the flue gas, there is a possibility that a need will arise to perform additional processing on the flue gas or waste water in order to reduce the effects on the environment. In this case, the processing load increases. In the technology disclosed in the above described Patent Document 2, there is the drawback that metal chloride, which is corrosive and toxic and is difficult to handle, must be used. In the technology disclosed in the above described Patent Document 3, because a structure is employed in which a catalyst that requires a carrier is produced, there is an increase in the production costs in order to produce the catalyst. Furthermore, because the structure requires that a mercury oxidizing apparatus be newly provided, there is also an increase in equipment costs.

DISCLOSURE OF INVENTION

The present invention was conceived in view of the above described circumstances and it is an object thereof to provide a method and apparatus for removing gaseous mercury in flue gas that make it possible to remove mercury in flue gas extremely satisfactorily while handling is made easy and cost increases are kept under control.

In order to solve the above described problems, in the method of removing gaseous mercury in flue gas of the present invention, after water-insoluble mercury in the flue gas is converted into water-soluble mercury by placing the flue gas in contact with a solid catalyst formed by a metal oxide, wet-type absorption is performed on the water-soluble mercury.

According to the present invention, it is possible to convert water-insoluble mercury that is contained in flue gas into water-soluble mercury using an easily handled metal oxide. By additionally performing wet-type absorption on the water-soluble mercury, mercury in the flue gas can be removed.

In the present invention, the solid catalyst is coated on contact surfaces that come into contact with the flue gas of components that are located on a flow path of the flue gas, and water-insoluble mercury is converted into water-soluble mercury by causing the flue gas to come into contact with the solid catalyst that is coated on the contact surfaces.

According to the present invention, by coating a solid catalyst formed by a metal oxide on contact surfaces between the flue gas and components that have been placed on the flow path (i.e., gas duct) of the flue gas, the flue gas flowing along the flow path is able to make contact with the solid catalyst that has been coated on the contact surfaces. Accordingly, after the water-insoluble mercury in the flue gas has been converted into water-soluble mercury, it is able to undergo satisfactory wet-type absorption and be removed. In addition, because a structure is employed in which the solid catalyst is coated onto components, it is possible for the solid catalyst to be coated onto the surfaces of existing devices and components and it is not necessary for new equipment to be provided. As a result, equipment costs can be kept low. Furthermore, because a structure is employed in which a metal oxide is coated as a solid catalyst directly onto a component and the solid catalyst does not need to be carried on a carrier, it is possible to reduce the manufacturing costs needed to manufacture the catalyst. Accordingly, the costs of manufacturing the catalyst can be kept low.

In the present invention, an absorption apparatus that performs wet-type absorption on the water-soluble mercury is provided partway along the flow path, and the solid catalyst is coated on the contact surfaces of components located on an upstream side of the absorption apparatus, and wet-type absorption is performed on the water-soluble mercury by the absorption apparatus.

According to the present invention, it is possible to convert water-insoluble mercury into water-soluble mercury on the upstream side of the absorption apparatus, and the converted water-soluble mercury can be properly absorbed by the absorption apparatus.

In the present invention, the solid catalyst is at least any one of $Fe_2O_3$, $CuO$, $MnO_2$, $Al_2O_3$, and $V_2O_5$.

According to the present invention, it is possible to satisfactorily convert water-insoluble mercury into water-soluble mercury using these easily-handled metal oxides.

The apparatus for removing gaseous mercury in flue gas of the present invention includes: an absorption apparatus that is provided partway along a flow path of flue gas that contains water-insoluble mercury, and that performs wet-type absorption on predetermined substances in the flue gas, wherein a solid catalyst that is formed by a metal oxide is coated on contact surfaces of components located on an upstream side of the absorption apparatus that come into contact with the flue gas, and wherein water-insoluble mercury in the flue gas is converted into water-soluble mercury by causing the flue gas to come into contact with the solid catalyst, and wet-type absorption is then performed on the water-soluble mercury by the absorption apparatus.

According to the present invention, it is possible to convert water-insoluble mercury into water-soluble mercury using easily-handled metal oxides. In addition, by coating a solid catalyst formed by a metal oxide on contact surfaces between the flue gas and components that have been placed on the flow path (i.e., gas duct) of the flue gas, the flue gas flowing along the flow path is able to make contact with the solid catalyst that has been coated on the contact surfaces. Accordingly, after the water-insoluble mercury in the flue gas has been converted into water-soluble mercury, it is able to undergo satisfactory wet-type absorption and be removed. In addition, because a structure is employed in which a solid catalyst is coated onto components, it is possible for the solid catalyst to be coated onto the surfaces of existing devices and components and it is not necessary for new equipment to be provided. As a result, equipment costs can be kept low. Furthermore, because a structure is employed in which a metal oxide is coated as a solid catalyst directly onto a component and the solid catalyst does not need to be carried on a carrier, it is possible to reduce the manufacturing costs needed to manufacture the catalyst. Accordingly, the costs of manufacturing the catalyst can be kept low.

In the present invention, the absorption apparatus includes a wet-type denitrification apparatus that performs wet-type absorption on sulfur oxides in the flue gas.

According to the present invention, using a wet-type denitrification apparatus, it is possible to efficiently absorb and remove both sulfur oxides and water soluble mercury from flue gas.

In the present invention, the solid catalyst is also coated on contact surfaces of the absorption apparatus that come into contact with the flue gas.

According to the present invention, directly prior to the mercury undergoing wet-type absorption, water-insoluble mercury can be made to contact a solid catalyst and be converted into water-soluble mercury, so that more reliable wet-type absorption of the mercury can be performed.

In the present invention, the contact surfaces include contact surfaces of a reinforcing component that is provided at an intake portion where the flue gas enters the absorption apparatus, and the solid catalyst is also coated on the surfaces of the reinforcing portion.

In the present invention, a plurality of devices that perform predetermined processings on the flue gas are placed between a boiler that generates flue gas by firing fuel and the flue apparatus, and the solid catalyst is coated on a contact surface of at least one device from among the plurality of devices that comes into contact with the flue gas.

According to the present invention, by coating a solid catalyst on contact surfaces of the various devices that constitute the apparatus for removing gaseous mercury in flue gas that come into contact with the flue gas, for example, the heat recovery device, the fan, and the electrostatic precipitator and the like, water-insoluble mercury contained in flue gas generated from the boiler is converted into water soluble mercury as it passes through these devices. It then arrives at the absorption apparatus and is absorbed and removed.

Furthermore, in the present invention, it is also possible to employ a structure in which the devices include a denitrification apparatus that removes nitrogen oxides from the flue gas, and the solid catalyst is coated on contact surfaces of the denitrification apparatus that come into contact with the flue gas.

Moreover, it is also possible to employ a structure in which the denitrification apparatus is provided with a rectifier that straighten a flow of the flue gas, and the solid catalyst is also coated on surfaces of the rectifier.

Moreover, it is also possible to employ a structure in which the denitrification apparatus has a basket in which a catalytic layer has been loaded, and the solid catalyst is also coated on surfaces of the rectifier.

Moreover, it is also possible to employ a structure in which the devices include an air preheater that uses heat from the flue gas to preheat air for firing by the boiler, and the solid catalyst is coated on contact surfaces of the air preheater that come into contact with the flue gas.

Moreover, it is also possible to employ a structure in which the devices include a heat recovery device, and the solid catalyst is coated on contact surfaces of the heat recovery device that come into contact with the flue gas.

Moreover, it is also possible to employ a structure in which the devices include a dust collector that collects dust from the flue gas, and the solid catalyst is coated on contact surfaces of the dust collector that come into contact with the flue gas.

Moreover, it is also possible to employ a structure in which the dust collector is provided with a rectifier that straighten a flow of the flue gas, and the solid catalyst is also coated on surfaces of the rectifier.

Moreover, it is also possible to employ a structure in which the devices include a fan that generates a flow of flue gas, and the solid catalyst is coated on contact surfaces of the fan that come into contact with the flue gas.

Moreover, it is also possible to employ a structure in which the solid catalyst is also coated on internal wall surfaces of a duct that connects the devices together, on an internal reinforcing component, and on the rectifier.

According to the present invention, it is possible to provide a method and removal apparatus for removing gaseous mercury in flue gas that make it possible to remove mercury in flue gas extremely satisfactorily while handling is made easy and cost increases are kept under control.

EXPLANATION OF SYMBOLS

Figure 1:
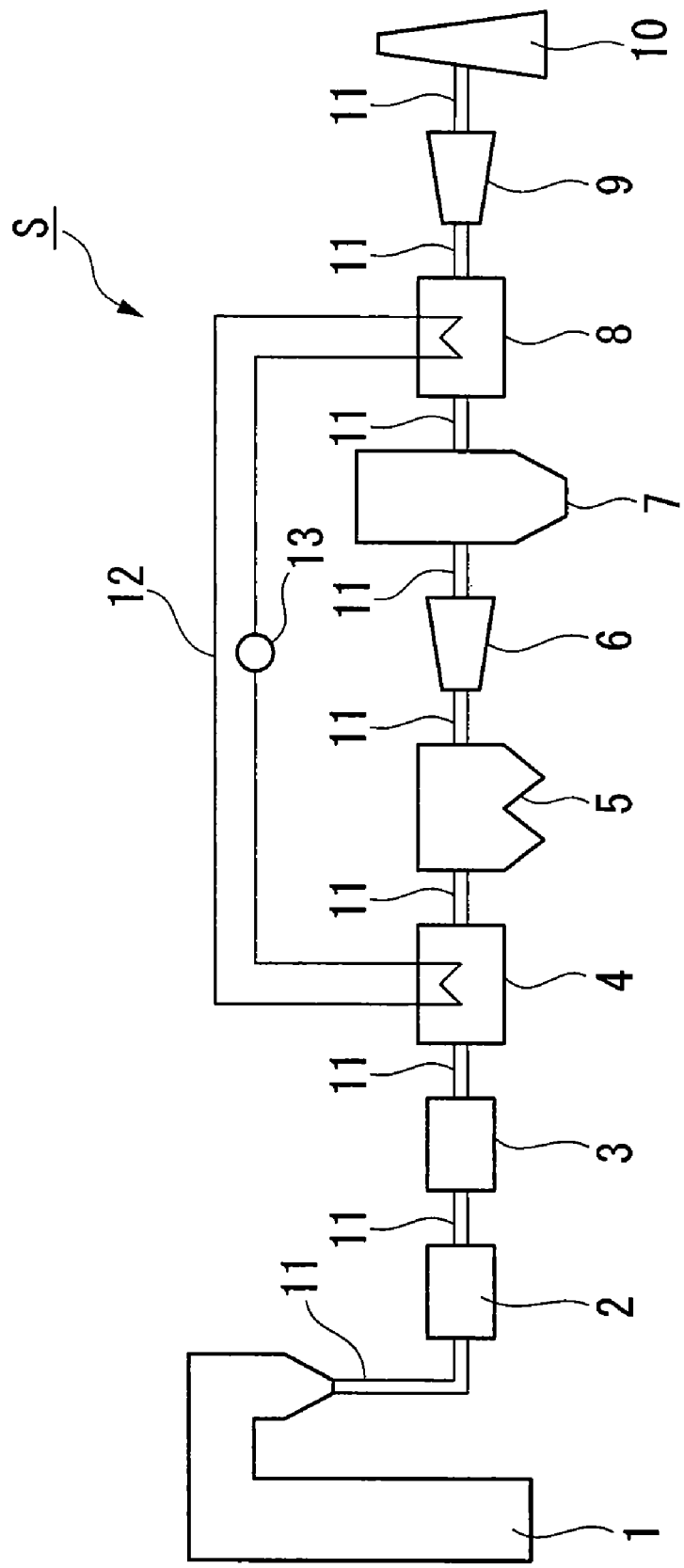
FIG. 1 is a schematic structural view showing an apparatus for removing gaseous mercury in flue gas according to an embodiment of the present invention.

1 Boiler
2 Denitrification apparatus
3 Air preheater
4 Heat recovery device
5 Electrostatic precipitator
6 Induced draft fan
7 Wet-type denitrification apparatus
8 Reheating device
9 Boost up fan
10 Stack
S Removal apparatus

BEST MODE FOR CARRYING OUT THE INVENTION

An embodiment of the present invention will now be described with reference made to the drawings. FIG. 1 is a schematic structural view of an apparatus for removing gaseous mercury in flue gas according to an embodiment of the present invention.

In FIG. 1, a removal apparatus S is used to process flue gas that is generated by a boiler 1 due to a combustion of fuel. The removal apparatus S is provided with a denitrification apparatus 2 that is provided downstream from the boiler 1 and removes nitrogen oxides (NOx), an air preheater 3 that is provided downstream from the denitrification apparatus 2 and heats air used for combustion in the boiler, a heat recovery device 4 that is provided downstream from the air preheater 3 and recovers heat, an electrostatic precipitator 5 that is provided downstream from the heat recovery device 4 and removes dust (i.e., particles) in the flue gas, an induced draft fan (i.e., a fan) 6 that is provided downstream from the electrostatic precipitator 5, a wet-type denitrification apparatus 7 that serves as an absorption apparatus to wet-type absorb predetermined substances in the flue gas, a reheating device 8 that is provided downstream from the wet-type denitrification apparatus 7 and reheats the flue gas, and a boost up fan 9 that is provided downstream from the reheating device 8.

The flue gas that is processed in the removal apparatus S is emitted into the atmosphere via a stack 10. The various devices 2, 3, 4, 5, 6, 7, 8, and 9 that are positioned between the boiler 1 and the stack 10 and perform various predetermined processings on the flue gas are connected via a duct 11. Flue gas generated by the boiler 1 flows via the duct 11 in sequence through the plurality of devices 2, 3, 4, 5, 6, 7, 8, and 9 and is then emitted by the stack 10.

The boiler 1 generates flue gas by firing fuel. In the flue gas generated by the boiler 1 are included nitrogen oxides (NOx), sulfur oxides (SOx), water-insoluble gaseous mercury (elemental mercury: $Hg^0$), and hydrogen halides (such as HCl) and the like. The nitrogen oxides in the flue gas are removed by the denitrification apparatus 2. The denitrification apparatus 2 in the present embodiment is a dry denitrification apparatus that injects a reducing agent such as ammonia into the flue gas so as to reduce and decompose the nitrogen oxides using a catalyst.

Figure 2:
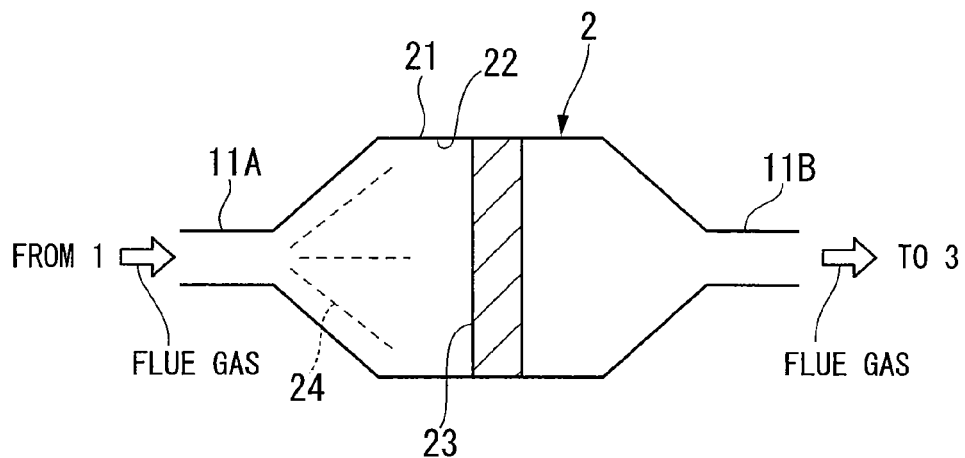
FIG. 2 is a typical view showing a denitrification apparatus in an embodiment of the present invention.

FIG. 2 is a typical view showing the denitrification apparatus 2. The denitrification apparatus 2 is provided with a housing 21 and a catalytic layer 23 that is positioned on an inner side of the housing 21. An intake portion for an internal space of the housing 21 is connected via a duct 11A to the boiler 1, while an exit portion thereof is connected via a duct 11B to the air preheater 3. The catalytic layer 23 is obtained by shaping and then firing a base metal-based oxide in, for example, a honeycomb shape, and is then loaded into a plurality of baskets made from steel plate that are then arranged in rows inside the housing 21. It is also possible to provide a rectifier (a guide vane) 24 inside the housing 21 that straighten the flow of flue gas from the boiler 1. Note that the shape of the catalytic layer 23 is not limited to being a honeycomb shape and an optional shape such as, for example, a plate shape may also be employed.

The air preheater 3 is an apparatus that uses exhaust heat from the flue gas to preheat air used for firing by the boiler and a known air preheater such as a tubular air preheater, a plate air preheater, or a regenerative air preheater may be used therefor. For example, a regenerative air preheater uses a system in which air is heated by placing a heat transfer—heat storage object made from a number of metal plates alternately in contact with the flue gas and the air.

Figure 3:
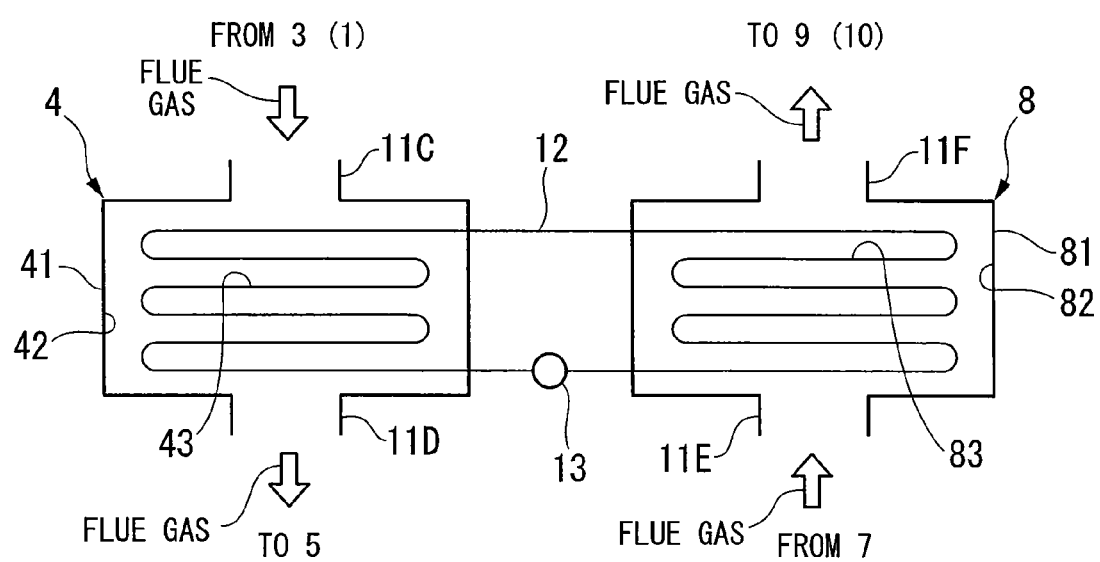
FIG. 3 is a typical view showing a heat recovery device and a reheating device in an embodiment of the present invention.

The heat recovery device 4 recovers heat from the flue gas and thereby cools the flue gas. The recovered heat energy is supplied to the reheating device 8. FIG. 3 is a typical view showing a relationship between the heat recovery device 4 and the reheating device 8. As is shown in FIG. 3, the heat recovery device 4 is provided with a housing 41 and a heat transfer component 43 that is located inside the housing 41 and recovers heat as a result of coming into contact with flue gas.

An intake portion and an exit portion for the internal space of the housing 41 are provided in the housing 41. The intake portion is connected via a duct 11C to the air preheater 3, while the exit portion is connected via a duct 11D to the electric duct collector 5. The reheating device 8 is provided with a housing 81 and a heat transfer component 83 that is located inside the housing 81 and heats the flue gas as a result of coming into contact with the flue gas. An intake portion and an exit portion for the interior space of the housing 81 are provided in the housing 81. The intake portion is connected via a duct 11E to the wet-type denitrification apparatus 7, while the exit portion is connected via a duct 11F to the boost up fan 9.

The heat transfer components 43 and 83 each have an internal flow path along which flows a heat transfer medium. The heat transfer component 43 (i.e., the heat recovery device 4) and the heat transfer component 83 (i.e., the reheating device 8) are connected together via a flow path 12 along which flows a heat transfer medium. A pump 13 that circulates a heat transfer medium between the heat recovery device 4 and the reheating device 8 is provided partway along the flow path 12 and the heat recovery device 4 and the reheating device 8 exchange heat energy using the heat transfer medium as an agent. In the present embodiment the heat recovery device 4 and the reheating device 8 are formed by gas—gas heaters that directly exchange heat with each other.

Figure 4A:
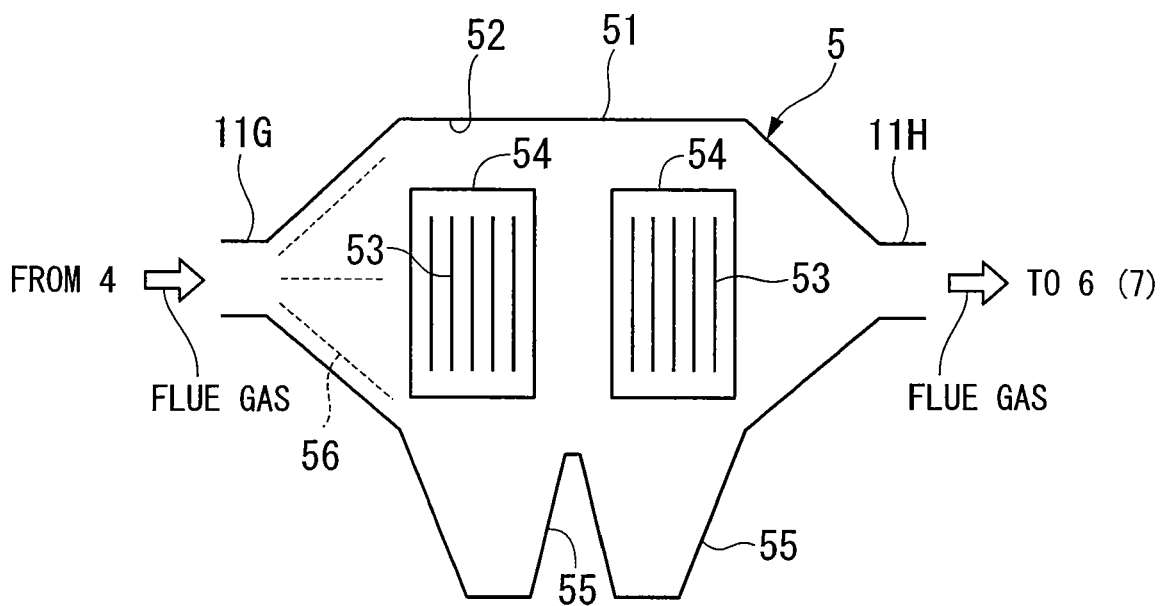
FIG. 4A is a first typical view showing a dust collector in an embodiment of the present invention.
Figure 4B:
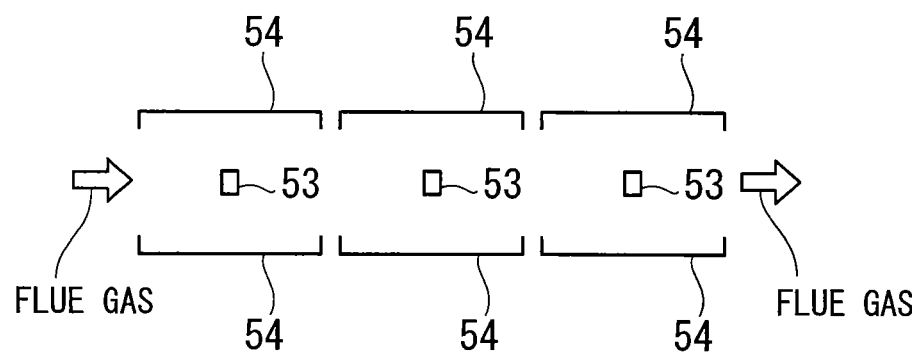
FIG. 4B is a second typical view showing a dust collector in an embodiment of the present invention.

The electrostatic precipitator 5 removes solid components such as particles (i.e., ash dust) from the flue gas. FIG. 4A is a typical view showing the electrostatic precipitator 5, while FIG. 4B shows a relationship between an emission electrode and a dust collecting electrode. In FIGS. 4A and 4B, the electrostatic precipitator 5 is provided with a housing 51, and emission electrodes 53, dust collecting electrodes 54, and a rectifier 56 that are located inside the housing 51.

An intake portion for the internal space inside the housing 51 is connected via a duct 11G to the heat recovery device 4, while an exit portion thereof is connected via a duct 11H to the induced draft fan 6. In addition, hoppers 55 are provided beneath the housing 51. The electrostatic precipitator 5 guides flue gas to an electric field that is formed between the emission electrodes 53 and the dust collecting electrodes 54 and collects dust by attracting particles in the flue gas to the dust collecting electrodes 54 using electric force. The particles adhering to the dust collecting electrodes 54 are peeled from the surface of the dust collecting electrodes 54 using the impact force of a percussion hammer (not shown) and drop into the hoppers 55 where they are collected. Note that there are no particular limitations as to the electrostatic precipitator that is used provided that it is able to collect coarse dust in the flue gas prior to it being introduced into the wet-type denitrification apparatus 7.

Figure 5:
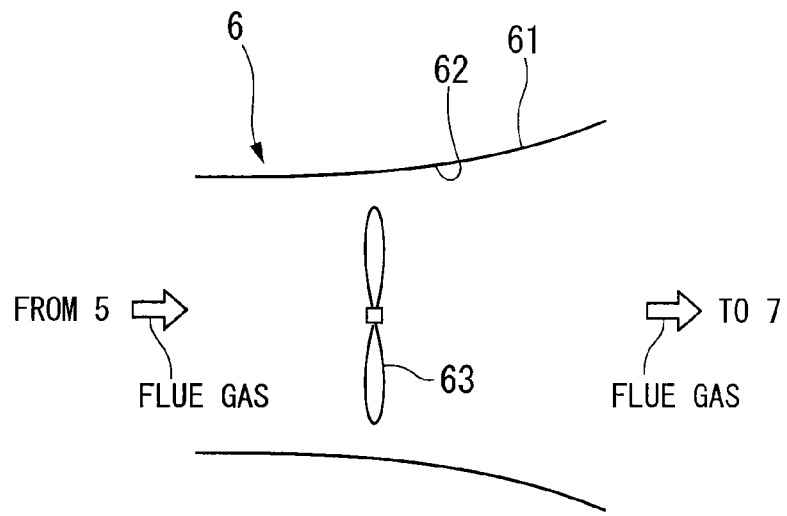
FIG. 5 is a typical view showing a fan in an embodiment of the present invention.

The induced draft fan 6 guides flue gas towards the downstream side (i.e., towards the wet-type denitrification apparatus 7) and, as is shown in FIG. 5, is provided with a casing 61 and rotor blades 63 that are located inside the casing 61. Flue gas that flows into the interior of the casing 61 through an intake portion that is provided at one end portion of the casing 61 is driven by the rotor blades 63 and made to pass through the interior of the casing 61, and then exits through the exit portion and is fed to the wet-type denitrification apparatus 7.

Figure 6:
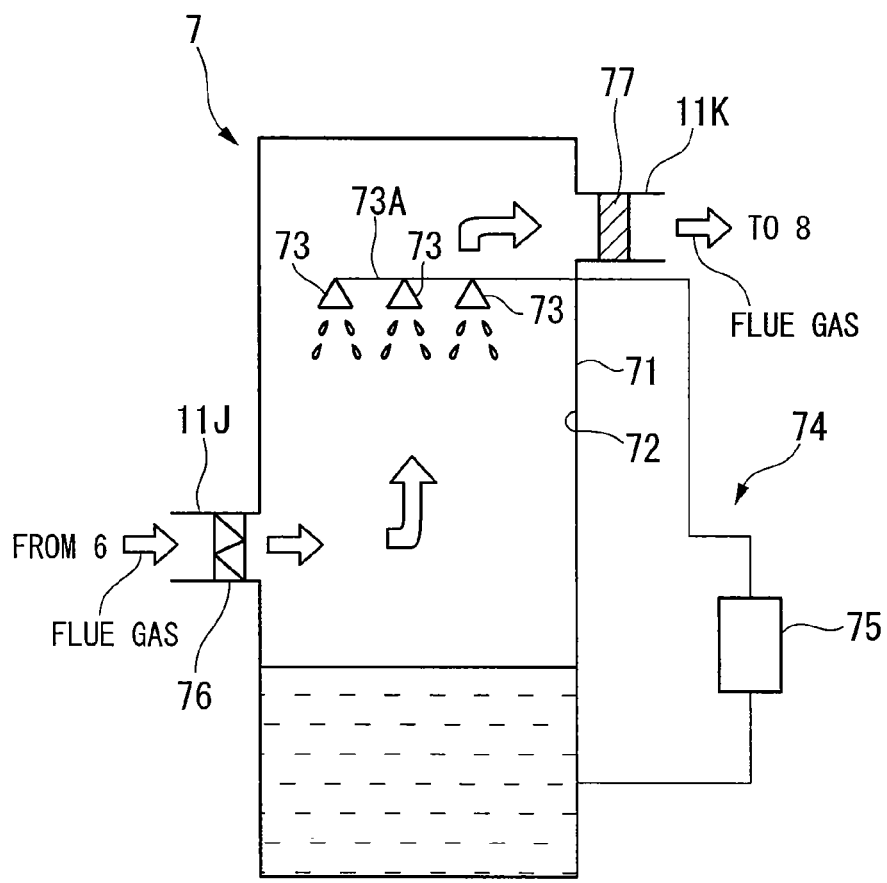
FIG. 6 is a typical view showing a wet-type denitrification apparatus in an embodiment of the present invention.

The wet-type denitrification apparatus 7 removes predetermined substances such as sulfur oxides from the flue gas by absorbing them into a solution. FIG. 6 is a typical view of the wet-type denitrification apparatus 7. The wet-type denitrification apparatus 7 performs denitrification and dust removal using droplets (i.e., droplets in spray form) of an alkaline absorption liquid that includes limestone. The wet-type denitrification apparatus 7 is provided with a housing 71 and spray nozzles 73 that are located in a top portion inside the housing 71, and supply the absorption liquid after changing it into droplet form (i.e., spray form).

An intake portion for the internal space inside the housing 71 is connected via a duct 11J to the induced draft fan 6, while an exit portion thereof is connected via a duct 11K to the reheating device 8. In the present embodiment, the intake portion is located in a bottom portion of the housing 71 while the exit portion is located in a top potion of the housing 71.

Flue gas that is taken via the duct 11J into the interior of the housing 71 of the wet-type denitrification apparatus 7 is placed in contact with the droplets (i.e. absorption liquid) supplied from the spray nozzles 73 until it exits from the exit portion. As a result, predetermined substances including SOx in the flue gas are absorbed by the solution. Furthermore, fine particles (i.e., dust) in the flue gas are also collected in the droplets. Absorption liquid that has dropped down accumulates in the bottom portion of the housing 71 and is returned via a spray pipe 73A to the spray nozzles 73 by a recirculation pump 75 that constitutes a recirculation system 74. The absorption liquid is thus used cyclically.

Figure 7:
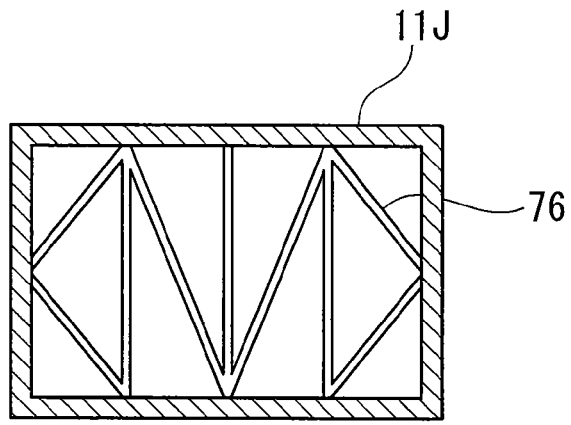
FIG. 7 is a typical view showing a reinforcing component that is mounted on the wet-type denitrification apparatus in an embodiment of the present invention.

Here, in the present embodiment, a reinforcing component 76 such as that shown in FIG. 7 is provided in the intake portion of the housing 71. In addition, a mist eliminator 77 is provided in the exit portion thereof. Note that there are no particular limitations as to the wet-type denitrification apparatus 7 that is used and a wet-type denitrification apparatus or a denitrification apparatus having a cooling tower installed prior to an absorption tower or the like that are typically used in flue gas processing may be used.

Moreover, here, a description is given of a spray tower, however, another type such as a packed tower or a fountain scrabbing tower may also be used. Furthermore, in the present embodiment, the intake portion is located in a bottom portion of the housing 71 and the exit portion is located in a top portion of the housing 71, however, it is also possible to employ a structure in which the intake portion is located in the top portion of the housing and the exit portion is located in the bottom portion of the housing.

As has been described above, the reheating device 8 uses heat energy recovered by the heat recovery device 4 to heat the flue gas whose temperature has been lowered. If the flue gas having a lowered temperature is emitted unmodified from the stack 10, then drawbacks arise such as white smoke being generated from water vapor. If, however, the flue gas is heated by the reheating device 8, the aforementioned drawback can be prevented. In addition, flue gas that has been heated by the reheating device 8 is emitted into the atmosphere from the stack 10 by the driving of the boost up fan 9.

The respective devices that are placed between the boiler 1 and the wet-type denitrification apparatus 7 on the flow path (i.e., the gas duct) between the boiler 1 and the stack 10, namely, the denitrification apparatus 2, the air preheater 3, the heat recovery device 4, the electrostatic precipitator 5, and the induced draft fan 6 that are located on the upstream side of the wet-type denitrification apparatus 7, as well as the duct 11 that connects these together are each provided with a solid catalyst formed by a metal oxide that converts water-insoluble mercury (i.e., elemental mercury: $Hg^0$) in the flue gas into water soluble mercury (i.e., bivalent mercury: $Hg^{2+}$).

Furthermore, a solid catalyst is also provided on a portion of the wet-type denitrification apparatus 7. Specifically, a solid catalyst formed by a metal oxide is coated on contact surfaces of those components, from among the respective components constituting the devices 2 to 6, the device 11, and a portion of the wet-type denitrification apparatus 7, that are located on the flue gas flow path (i.e., the gas duct) that come into contact with the flue gas.

In the present embodiment, a solid catalyst formed by a metal oxide is coated on an inner wall surface of the duct 11, an inner wall surface 22 including the vicinities of the intake portion and exit portion of the housing 21 of the denitrification apparatus 2, a surface of the catalytic layer 23, a basket surface that supports this catalytic layer 23, and surfaces of the rectifier 24 and the like. If the air preheater 3 is a regenerative type of air preheater, then a solid catalyst formed by a metal oxide or the like is also coated on an inner wall surface of the housing constituting the air preheater 3 and on surfaces of the heat transfer—heat storage object that is formed by metal plates.

A solid catalyst formed by a metal oxide or the like is also coated on an inner wall surface 42 including the vicinities of the intake portion and exit portion of the housing 41 of the heat recovery device 4, and on surfaces of the heat transfer component 43 that come into contact with the flue gas.

Furthermore, a solid catalyst formed by a metal oxide or the like is also coated on an inner wall surface 52 including the vicinities of the intake portion and exit portion of the housing 51 of the electrostatic precipitator 5, and on surfaces of the emission electrodes 53, surfaces of the dust collecting electrodes 54, inner wall surfaces of the hoppers 55, and surfaces of the rectifier 56. Moreover, a solid catalyst formed by a metal oxide or the like is also coated on an inner wall surface 62 including the vicinities of the intake portion and exit portion of the housing 61 of the induced draft fan 6, and on surfaces and the like of the rotor blades 63.

In addition, a solid catalyst formed by a metal oxide or the like is also coated on an inner wall surface 72 including the vicinity of the intake portion of the housing 71 of the wet-type denitrification apparatus 7, and on surfaces of the spray nozzles 73 and on the spray pipe and the like. A solid catalyst formed by a metal oxide or the like is also coated on the surface of the reinforcing component 76.

Note that a solid catalyst formed by a metal oxide or the like may also be coated on an inner wall surface 72 including the vicinity of the exit portion of the housing 71. Alternatively, it is also possible to coat a solid catalyst formed by a metal oxide or the like on inner wall surfaces and the like of the ducts constituting the recirculation system 74. Furthermore, it is also possible to coat a solid catalyst formed by a metal oxide or the like on a surface of the mist eliminator 77.

A plurality of materials such as $Fe_2O_3$, $CuO$, $MnO_2$, $Al_2O_3$, and $V_2O_5$ may be used for the coated solid catalyst. In this case, a structure in which one of these plurality of materials is coated may be employed, or a structure in which a selected plurality of types of material are coated may be employed.

When coating a solid catalyst formed by a metal oxide or the like on each of the aforementioned components, for example, after the metal oxide has been dispersed or dissolved in a solvent so as to produce a solution containing metal oxide, by then coating this solution on the components and drying it, the solid catalyst formed by the metal oxide is provided on each component.

Next, an operation of a flue gas removal apparatus S of the present embodiment will be described.

As is described above, in the flue gas generated by the boiler 1 are included nitrogen oxides (NOx), sulfur oxides (SOx), water-insoluble gaseous mercury (elemental mercury: $Hg^0$), and hydrogen halides (such as HCl) and the like.

The nitrogen oxides in the flue gas are mainly removed by the denitrification apparatus 2, while the sulfur oxides are mainly removed by the wet-type denitrification apparatus 7.

As the flue gas generated by the boiler 1 cools, a portion of the gaseous elemental mercury $Hg^0$ contained in the flue gas is converted into water-soluble gaseous bivalent mercury $Hg^{2+}$ and particulate-band (i.e., solid) mercury $Hg^P$. The particulate-band mercury $Hg^P$ is recovered by the electrostatic precipitator 5.

Moreover, even if the electrostatic precipitator 5 is unable to completely recover all the particulate-band mercury $Hg^P$, the wet-type denitrification apparatus 7 is able to recover the remaining particulate-band mercury $Hg^P$ that was not recovered by the dust collector 5. Furthermore, the wet-type denitrification apparatus 7 is able to recover fine particles (i.e., dust) in the flue gas.

The water-soluble bivalent mercury $Hg^{2+}$ undergoes wet-type absorption by the wet-type denitrification apparatus 7.

It should be noted that not all of the gaseous elemental mercury $Hg^0$ in the flue gas generated by the boiler 1 is converted during the cooling of the gas into particulate-band mercury $Hg^P$ or bivalent mercury $Hg^{2+}$.

Therefore, in the present embodiment, from among the elemental mercury contained in the flue gas generated by the boiler 1, by causing the remaining elemental mercury $Hg_0$ that has not been converted into particulate-band mercury $Hg^P$ and bivalent mercury $Hg^{2+}$ to come into contact with a solid catalyst formed by a metal oxide, after this water-insoluble elemental mercury $Hg^0$ has been converted into water-soluble bivalent mercury $Hg^{2+}$, it undergoes wet-type absorption by the wet-type denitrification apparatus 7. The wet-type denitrification apparatus 7 performs wet-type denitrification on flue gas containing SOx and mercury using an alkaline absorption liquid.

In this manner, the flue gas that has been emitted from the boiler 1 and from which the NOx has been removed by the denitrification apparatus 2 and from which the SOx and Hg have been removed by the wet-type denitrification apparatus 7 is introduced into the reheating device 8. Here, it is heated using heat energy recovered by the heat recovery device 4 and is emitted from the stack 10.

In the present embodiment, it is possible to convert water-insoluble elemental mercury $Hg^0$ that is contained in flue gas into water-soluble bivalent mercury $Hg^{3+}$ using an easily handled metal oxide. By additionally performing wet-type absorption on the water-soluble bivalent mercury $Hg^{2+}$, mercury in the flue gas can be removed.

By also coating a solid catalyst formed by a metal oxide on contact surfaces between the flue gas and components that have been placed on the flow path (i.e., gas duct) of the flue gas, the flue gas flowing along the flow path is able to make contact with the solid catalyst that has been coated on the contact surfaces. Accordingly, after the water-insoluble elemental mercury $Hg^0$ in the flue gas has been converted into water-soluble bivalent mercury $Hg^{2+}$, it is able to undergo satisfactory wet-type absorption and be removed.

In addition, because a structure is employed in which the solid catalyst is coated on components, it is possible for the solid catalyst to be coated on the surface of existing devices and components and it is not necessary for new equipment to be provided. As a result, equipment costs can be kept low. Furthermore, because a structure is employed in which a metal oxide is coated as a solid catalyst directly onto a component and the solid catalyst does not need to be carried on a carrier, it is possible to reduce the manufacturing costs needed to manufacture the catalyst. Accordingly, the costs of manufacturing the catalyst can be kept low.

In addition, because the wet-type denitrification apparatus 7 is provided partway along the flow path (i.e., gas duct) and the solid catalyst is coated on a portion of the wet-type denitrification apparatus 7 and on contact surfaces of components located on the upstream side of the wet-type denitrification apparatus 7 that come into contact with the flue gas, it is possible to convert water-insoluble elemental mercury $Hg^0$ into water-soluble bivalent mercury $Hg^{2+}$ on the upstream side of the wet-type denitrification apparatus 7.

Moreover, the water-insoluble elemental mercury $Hg^0$ that is contained in flue gas generated by the boiler 1 is converted into water-soluble bivalent mercury $Hg^{2+}$ as it passes through the respective devices 2 to 6, 11, and a portion of the wet-type denitrification apparatus 7 that are located between the boiler 1 and the wet-type denitrification apparatus 7. It then arrives at the wet-type denitrification apparatus 7, and is properly absorbed and removed.

Figure 8:
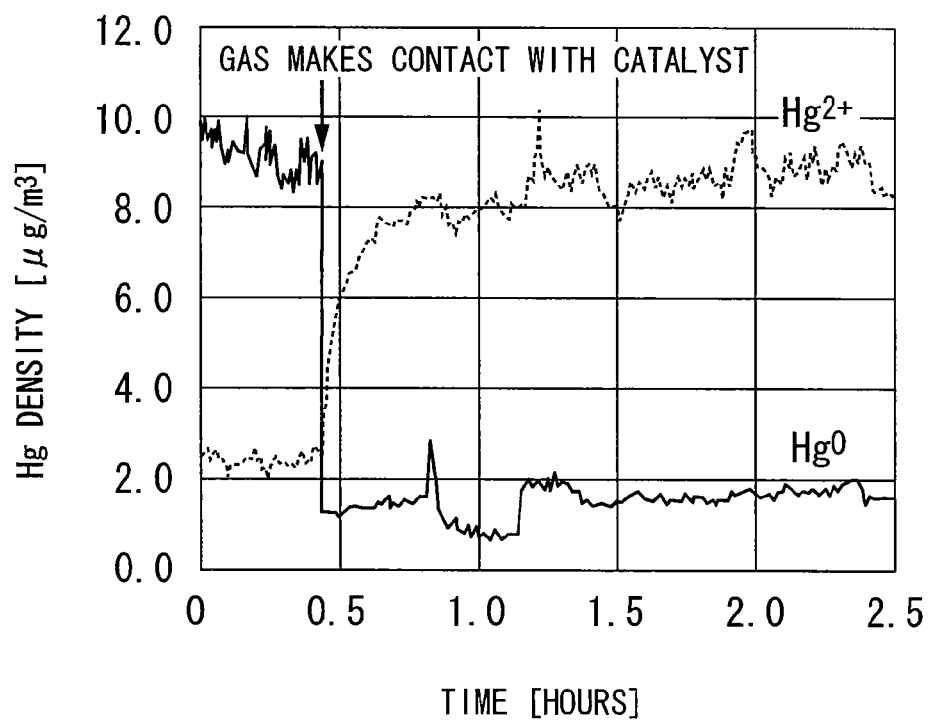
FIG. 8 is a graph showing results of an experiment to confirm the effects of the method of the present invention.

FIG. 8 is a graph showing results of an experiment in which water-insoluble elemental mercury $Hg^0$ is converted into water-soluble bivalent mercury $Hg^{2+}$ using $Fe_2O_3$, which is the metal oxide according to the present embodiment. As is shown in FIG. 8, it can seen that elemental mercury $Hg^0$ in the flue gas is converted into water-soluble bivalent mercury $Hg^{2+}$ by causing the $Fe_2O_3$ to come into contact with the flue gas. The same experiment was performed for $CuO$, $MnO_2$, $Al_2O_3$, and $V_2O_5$ and it was confirmed that elemental mercury $Hg_0$ in the flue gas could be converted into water-soluble bivalent mercury $Hg^{2+}$.

Note that, in the present embodiment, a description is given using a wet-type denitrification apparatus as an example of an absorption apparatus for absorbing water-soluble mercury, however, the absorption apparatus is not limited to a wet-type denitrification apparatus and any chosen apparatus may be employed provided that it is able to absorb and remove water-soluble bivalent mercury $Hg^{2+}$.

Note also that, in the present embodiment, particles (i.e., dust) that includes particulate-band mercury $Hg^P$ are recovered using an electrostatic precipitator 5, however, it is also possible to use a filtration dust collector such as a fabric filter. In this case as well, by coating or impregnating a solid catalyst formed by a metal oxide on that filter portion of the fabric filter through which flue gas passes, it is possible to convert water-insoluble elemental mercury $Hg^0$ into water-soluble bivalent mercury $Hg^{2+}$.

Note also that, in the above described embodiment, a description is given using an axial flow type of fan, such as that shown in typical view in FIG. 5, as an example of a fan, however, the present invention is not limited to this and it is also possible, for example, for a centrifugal type of fan to be used. In a centrifugal fan the solid catalyst is coated on a surface of, for example, an impeller.

Note also that, in the above described embodiment, a description is given using the reinforcing component 76 that is provided at the intake portion of the housing 71 as an example of a reinforcing component, however, the interior reinforcing component that is provided at an internal portion of the flue gas flow path is not limited to the reinforcing component 76 that is provided at an intake portion of the housing 71 and, for example, it is also possible to provide a reinforcing component at the exit portion of the housing 71 and to coat a solid catalyst on the surface of this reinforcing component.

Furthermore, it is also possible to provide a reinforcing component at a predetermined position inside the housings (or casings) of the respective devices 2, 3, 4, 5, 6, 7, 8, and 9, or at a predetermined position inside the duct 11, and to coat a solid catalyst on the surface of this reinforcing component.

Figure 9:
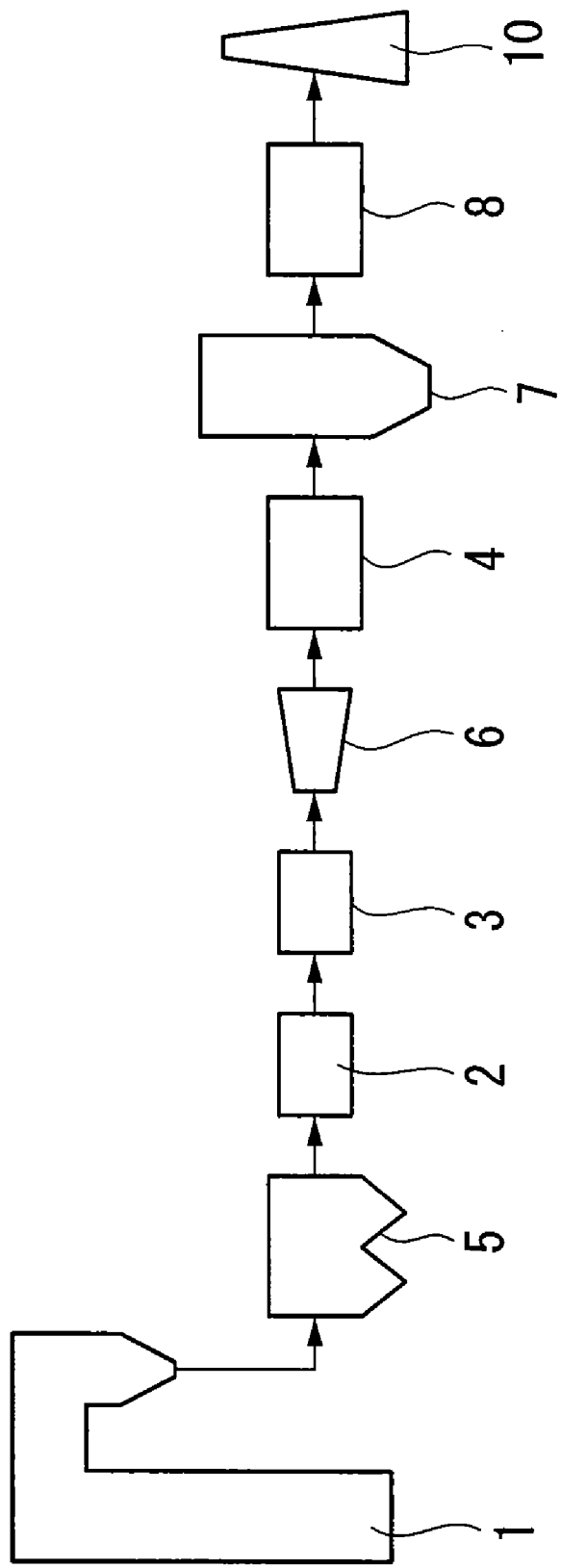
FIG. 9 is a schematic structural view showing an apparatus for removing gaseous mercury in flue gas according to another embodiment of the present invention.

Note also that, in the above described embodiment, the electrostatic precipitator 5 is placed between the heat recovery device 4 and the fan 6, however, the placement position of the electrostatic precipitator 5 is not limited to that shown in FIG. 1. For example, as is shown in FIG. 9, it is also possible to place in the following sequence moving from the boiler 1 to the downstream side the electrostatic precipitator, the denitrification apparatus 2, the air preheater 3, the fan 6, the heat recovery device 4, the absorption device 7, the reheating device 8, and the stack 10, and to coat a solid catalyst on contact surfaces of a removal apparatus S which has this structure that make contact with flue gas.

Figure 10:
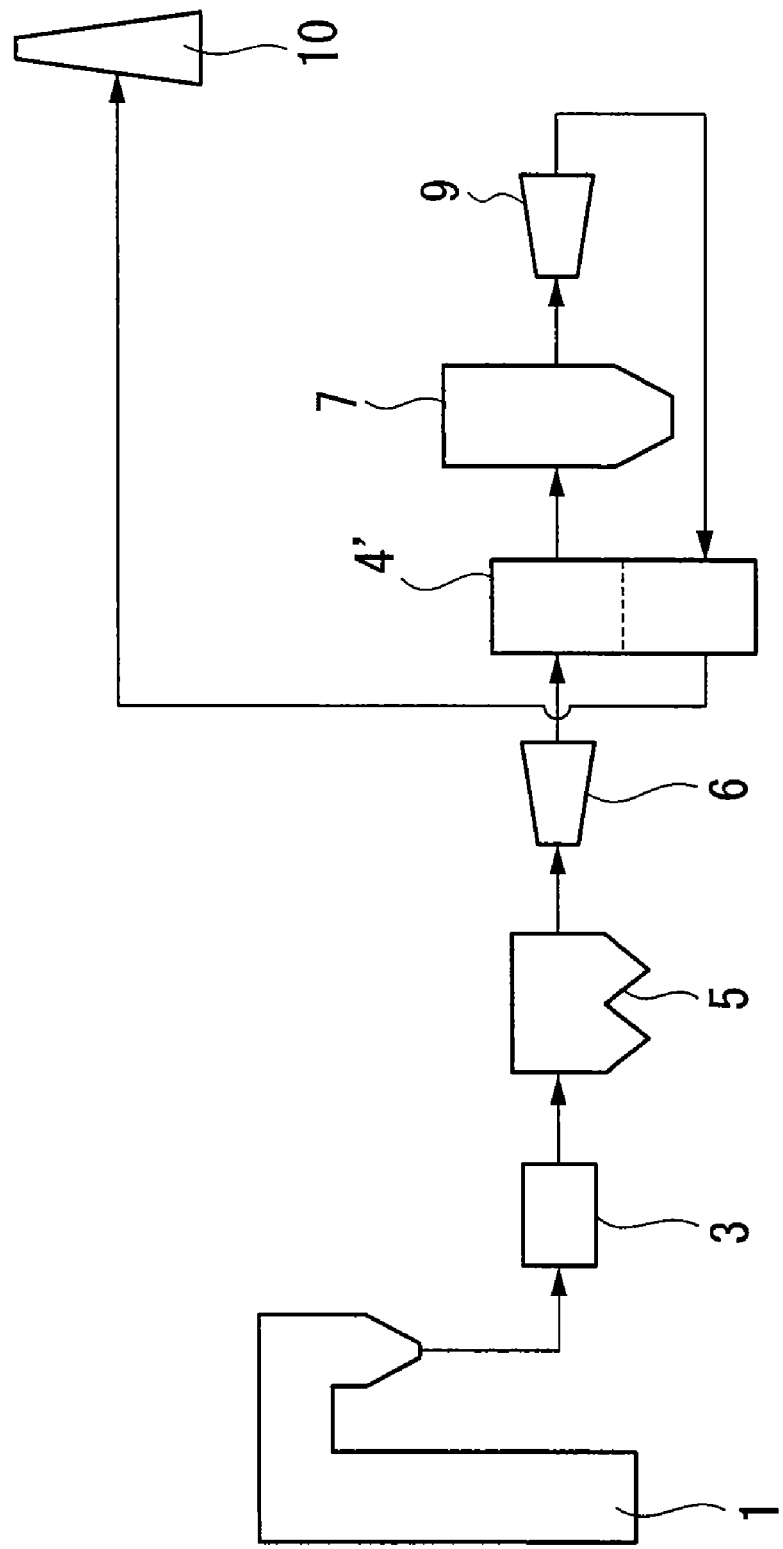
FIG. 10 is a schematic structural view showing an apparatus for removing gaseous mercury in flue gas according to yet another embodiment of the present invention.

Moreover, in the removal apparatus S in the above described embodiment, the heat recovery device 4 and the reheating device 8 exchange heat using a heat transfer medium flowing along the flow path 12, however, as is shown in FIG. 10, it is also possible to form a regenerative rotation type of structure in which, moving from the boiler 1 to the downstream side in the following sequence, are placed the air preheater 3, the electrostatic precipitator 5, the fan 6, a gas—gas heater 4', the absorption device 7, and the fan 9, and in which gas exiting the fan 9 is returned to the gas—gas heater 4'.

Here, the gas—gas heater 4' functions both as a heat recovery device that recovers heat from flue gas and as a reheating device that reheats gas emitted by the stack 10 and is formed by integrating a heat recovery device and a reheating device. In this type of structure as well, it is possible to coat a solid catalyst on contact surfaces of the gas—gas heater 4' that make contact with flue gas.

What is claimed is:

1. A method of removing gaseous mercury in flue gas comprising:
    coating a solid catalyst on contact surfaces that come into contact with the flue gas, wherein the contact surfaces are surfaces of components that are located on a flow path of the flue gas, and converting water-insoluble mercury into water-soluble mercury by causing the flue gas to come into contact with the solid catalyst that is coated on the contact surfaces;
    after water-insoluble mercury in the flue gas is converted into water-soluble mercury by placing the flue gas in contact with a solid catalyst formed by a metal oxide, performing wet-type absorption on the water-soluble mercury.

2. The removal method according to claim 1, further comprising providing an absorption apparatus that performs the wet-type absorption on the water-soluble mercury partway along the flow path of the flue gas, the coating of the solid catalyst is on the contact surfaces of components located on an upstream side of the absorption apparatus, and performing the wet-type absorption on the water-soluble mercury by the absorption apparatus.

3. The removal method according to claim 2, wherein the solid catalyst is at least any one of $Fe_2O_3$, $CuO$, $MnO_2$, $Al_2O_3$, and $V_2O_5$.

4. The removal method according to claim 1, wherein the solid catalyst is at least any one of $Fe_2O_3$, $CuO$, $MnO_2$, $Al_2O_3$, and $V_2O_5$.

5. A method of removing gaseous mercury in flue gas comprising converting water-insoluble mercury in the flue gas into water-soluble mercury by placing the flue gas in contact with a solid catalyst formed by a metal oxide only, wherein the metal oxide is selected from the group consisting of $Fe_2O_3$, $CuO$, $MnO_2$, $Al_2O_3$, and $V_2O_5$, and after the converting, performing wet-type absorption on the water-soluble mercury.

6. An apparatus for removing gaseous mercury in flue gas comprising:

an absorption apparatus that is provided partway along a flow path of flue gas that contains water-insoluble mercury, and that performs wet-type absorption on predetermined substances in the flue gas, wherein a solid catalyst that is formed by a metal oxide is coated on contact surfaces of components located on an upstream side of the absorption apparatus that come into contact with the flue gas, and wherein water-insoluble mercury in the flue gas is converted into water-soluble mercury by causing the flue gas to come into contact with the solid catalyst, and wet-type absorption is then performed on the water-soluble mercury by the absorption apparatus.

7. The removal apparatus according to claim 6, wherein the absorption apparatus includes a wet-type denitrification apparatus that performs wet-type absorption on sulfur oxides in the flue gas.

8. The removal apparatus according to claim 7, wherein a plurality of devices that perform predetermined processings on the flue gas are placed between a boiler that generates flue gas by firing fuel and the flue apparatus, and the solid catalyst is coated on contact surfaces of at least one device from among the plurality of devices that comes into contact with the flue gas.

9. The removal apparatus according to claim 8, wherein the devices include a denitrification apparatus that removes nitrogen oxides from the flue gas, and the solid catalyst is coated on contact surfaces of the denitrification apparatus that come into contact with the flue gas.

10. The removal apparatus according to claim 8, wherein the devices include an air preheater that uses heat from the flue gas to preheat air for firing by the boiler, and the solid catalyst is coated on contact surfaces of the air preheater that come into contact with the flue gas.

11. The removal apparatus according to claim 10, wherein the devices include a heat recovery device, and the solid catalyst is coated on contact surfaces of the heat recovery device that come into contact with the flue gas.

12. The removal apparatus according to claim 11, wherein the devices include a fan that generates a flow of flue gas, and the solid catalyst is coated on contact surfaces of the fan that come into contact with the flue gas.

13. The removal apparatus according to claim 11, wherein the solid catalyst is also coated on internal wall surfaces of a duct that connects the devices together, on internal reinforcing components, and on a guide vane.

14. The removal apparatus according to claim 11, wherein the devices include a dust collector that collects dust from the flue gas, and the solid catalyst is coated on contact surfaces of the dust collector that come into contact with the flue gas.

15. The removal apparatus according to claim 14, wherein the devices include a fan that generates a flow of flue gas, and the solid catalyst is coated on contact surfaces of the fan that come into contact with the flue gas.

16. The removal apparatus according to claim 14, wherein the solid catalyst is also coated on internal wall surfaces of a duct that connects the devices together, on internal reinforcing components, and on a guide vane.

17. The removal apparatus according to claim 14, wherein the dust collector is provided with a rectifier that straighten a flow of the flue gas, and the solid catalyst is also coated on surfaces of the rectifier.

18. The removal apparatus according to claim 10, wherein the devices include a dust collector that collects dust from the flue gas, and the solid catalyst is coated on contact surfaces of the dust collector that come into contact with the flue gas.

19. The removal apparatus according to claim 18, wherein the dust collector is provided with a rectifier that straighten a flow of the flue gas, and the solid catalyst is also coated on surfaces of the rectifier.

20. The removal apparatus according to claim 18, wherein the devices include a fan that generates a flow of flue gas, and the solid catalyst is coated on contact surfaces of the fan that come into contact with the flue gas.

21. The removal apparatus according to claim 18, wherein the solid catalyst is also coated on internal wall surfaces of a duct that connects the devices together, on internal reinforcing components, and on a guide vane.

22. The removal apparatus according to claim 10, wherein the devices include a fan that generates a flow of flue gas, and the solid catalyst is coated on contact surfaces of the fan that come into contact with the flue gas.

23. The removal apparatus according to claim 10, wherein the solid catalyst is also coated on internal wall surfaces of a duct that connects the devices together, on internal reinforcing components, and on a guide vane.

24. The removal apparatus according to claim 8, wherein the devices include a heat recovery device, and the solid catalyst is coated on contact surfaces of the heat recovery device that come into contact with the flue gas.

25. The removal apparatus according to claim 24, wherein the devices include a dust collector that collects dust from the flue gas, and the solid catalyst is coated on contact surfaces of the dust collector that come into contact with the flue gas.

26. The removal apparatus according to claim 25, wherein the dust collector is provided with a rectifier that straighten a flow of the flue gas, and the solid catalyst is also coated on surfaces of the rectifier.

27. The removal apparatus according to claim 25, wherein the devices include a fan that generates a flow of flue gas, and the solid catalyst is coated on contact surfaces of the fan that come into contact with the flue gas.

28. The removal apparatus according to claim 25, wherein the solid catalyst is also coated on internal wall surfaces of a duct that connects the devices together, on internal reinforcing components, and on a guide vane.

29. The removal apparatus according to claim 24, wherein the devices include a fan that generates a flow of flue gas, and the solid catalyst is coated on contact surfaces of the fan that come into contact with the flue gas.

30. The removal apparatus according to claim 24, wherein the solid catalyst is also coated on internal wall surfaces of a duct that connects the devices together, on internal reinforcing components, and on a guide vane.

31. The removal apparatus according to claim 8, wherein the devices include a dust collector that collects dust from the flue gas, and the solid catalyst is coated on contact surfaces of the dust collector that come into contact with the flue gas.

32. The removal apparatus according to claim 31, wherein the dust collector is provided with a rectifier that straighten a flow of the flue gas, and the solid catalyst is also coated on surfaces of the rectifier.

33. The removal apparatus according to claim 31, wherein the devices include a fan that generates a flow of flue gas, and the solid catalyst is coated on contact surfaces of the fan that come into contact with the flue gas.

34. The removal apparatus according to claim 31, wherein the solid catalyst is also coated on internal wall surfaces of a duct that connects the devices together, on internal reinforcing components, and on a guide vane.

35. The removal apparatus according to claim 8, wherein the devices include a fan that generates a flow of flue gas, and the solid catalyst is coated on contact surfaces of the fan that come into contact with the flue gas.

36. The removal apparatus according to claim 8, wherein the solid catalyst is also coated on internal wall surfaces of a duct that connects the devices together, on internal reinforcing components, and on a guide vane.

37. The removal apparatus according to claim 6, wherein a plurality of devices that perform predetermined processings on the flue gas are placed between a boiler that generates flue gas by firing fuel and the flue apparatus, and
the solid catalyst is coated on contact surfaces of at least one device from among the plurality of devices that comes into contact with the flue gas.

38. The removal apparatus according to claim 37, wherein the devices include a denitrification apparatus that removes nitrogen oxides from the flue gas, and the solid catalyst is coated on contact surfaces of the denitrification apparatus that come into contact with the flue gas.

39. The removal apparatus according to claim 37, wherein the devices include an air preheater that uses heat from the flue gas to preheat air for firing by the boiler, and the solid catalyst is coated on contact surfaces of the air preheater that come into contact with the flue gas.

40. The removal apparatus according to claim 39, wherein the devices include a heat recovery device, and the solid catalyst is coated on contact surfaces of the heat recovery device that come into contact with the flue gas.

41. The removal apparatus according to claim 40, wherein the devices include a fan that generates a flow of flue gas, and the solid catalyst is coated on contact surfaces of the fan that come into contact with the flue gas.

42. The removal apparatus according to claim 40, wherein the solid catalyst is also coated on internal wall surfaces of a duct that connects the devices together, on internal reinforcing components, and on a guide vane.

43. The removal apparatus according to claim 40, wherein the devices include a dust collector that collects dust from the flue gas, and the solid catalyst is coated on contact surfaces of the dust collector that come into contact with the flue gas.

44. The removal apparatus according to claim 43, wherein the dust collector is provided with a rectifier that straighten a flow of the flue gas, and the solid catalyst is also coated on surfaces of the rectifier.

45. The removal apparatus according to claim 43, wherein the devices include a fan that generates a flow of flue gas, and the solid catalyst is coated on contact surfaces of the fan that come into contact with the flue gas.

46. The removal apparatus according to claim 43, wherein the solid catalyst is also coated on internal wall surfaces of a duct that connects the devices together, on internal reinforcing components, and on a guide vane.

47. The removal apparatus according to claim 39, wherein the devices include a dust collector that collects dust from the flue gas, and the solid catalyst is coated on contact surfaces of the dust collector that come into contact with the flue gas.

48. The removal apparatus according to claim 47, wherein the dust collector is provided with a rectifier that straighten a flow of the flue gas, and the solid catalyst is also coated on surfaces of the rectifier.

49. The removal apparatus according to claim 47, wherein the devices include a fan that generates a flow of flue gas, and the solid catalyst is coated on contact surfaces of the fan that come into contact with the flue gas.

50. The removal apparatus according to claim 47, wherein the solid catalyst is also coated on internal wall surfaces of a duct that connects the devices together, on internal reinforcing components, and on a guide vane.

51. The removal apparatus according to claim 39, wherein the devices include a fan that generates a flow of flue gas, and the solid catalyst is coated on contact surfaces of the fan that come into contact with the flue gas.

52. The removal apparatus according to claim 39, wherein the solid catalyst is also coated on internal wall surfaces of a duct that connects the devices together, on internal reinforcing components, and on a guide vane.

53. The removal apparatus according to claim 37, wherein the devices include a heat recovery device, and the solid catalyst is coated on contact surfaces of the heat recovery device that come into contact with the flue gas.

54. The removal apparatus according to claim 53, wherein the devices include a dust collector that collects dust from the flue gas, and the solid catalyst is coated on contact surfaces of the dust collector that come into contact with the flue gas.

55. The removal apparatus according to claim 54, wherein the dust collector is provided with a rectifier that straighten a flow of the flue gas, and the solid catalyst is also coated on surfaces of the rectifier.

56. The removal apparatus according to claim 54, wherein the devices include a fan that generates a flow of flue gas, and the solid catalyst is coated on contact surfaces of the fan that come into contact with the flue gas.

57. The removal apparatus according to claim 54, wherein the solid catalyst is also coated on internal wall surfaces of a duct that connects the devices together, on internal reinforcing components, and on a guide vane.

58. The removal apparatus according to claim 53, wherein the devices include a fan that generates a flow of flue gas, and the solid catalyst is coated on contact surfaces of the fan that come into contact with the flue gas.

59. The removal apparatus according to claim 53, wherein the solid catalyst is also coated on internal wall surfaces of a duct that connects the devices together, on internal reinforcing components, and on a guide vane.

60. The removal apparatus according to claim 37, wherein the devices include a dust collector that collects dust from the flue gas, and the solid catalyst is coated on contact surfaces of the dust collector that come into contact with the flue gas.

61. The removal apparatus according to claim 60, wherein the dust collector is provided with a rectifier that straighten a flow of the flue gas, and the solid catalyst is also coated on surfaces of the rectifier.

62. The removal apparatus according to claim 60, wherein the devices include a fan that generates a flow of flue gas, and the solid catalyst is coated on contact surfaces of the fan that come into contact with the flue gas.

63. The removal apparatus according to claim 60, wherein the solid catalyst is also coated on internal wall surfaces of a duct that connects the devices together, on internal reinforcing components, and on a guide vane.

64. The removal apparatus according to claim 37, wherein the devices include a fan that generates a flow of flue gas, and the solid catalyst is coated on contact surfaces of the fan that come into contact with the flue gas.

65. The removal apparatus according to claim 37, wherein the solid catalyst is also coated on internal wall surfaces of a duct that connects the devices together, on internal reinforcing components, and on a guide vane.

* * * * *